United States Patent
Mui et al.

(10) Patent No.: US 10,064,048 B1
(45) Date of Patent: Aug. 28, 2018

(54) ACQUIRING PERMANENT IDENTIFIER OF USER EQUIPMENT BY GATEWAY IN MOBILE COMMUNICATION SYSTEM

(71) Applicant: Hong Kong Applied Science and Technology Research Institute Company Limited, Hong Kong (HK)

(72) Inventors: Ka Ho Mui, Hong Kong (HK); Yau Yau Yolanda Tsang, Hong Kong (HK); Yee Simon Wong, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 15/863,154

(22) Filed: Jan. 5, 2018

(51) Int. Cl.
*H04W 8/08* (2009.01)
*H04W 8/26* (2009.01)
*H04W 60/00* (2009.01)
*H04W 80/12* (2009.01)
*H04W 88/16* (2009.01)

(52) U.S. Cl.
CPC .............. *H04W 8/26* (2013.01); *H04W 8/08* (2013.01); *H04W 60/00* (2013.01); *H04W 80/12* (2013.01); *H04W 88/16* (2013.01)

(58) Field of Classification Search
CPC ......... H04W 8/08; H04W 8/26; H04W 60/00; H04W 76/10; H04W 88/16; H04W 80/12; H04W 88/18
See application file for complete search history.

(56) References Cited

U.S. PATENT DOCUMENTS

| 8,498,608 | B2 | 7/2013 | Chen | |
|---|---|---|---|---|
| 8,885,608 | B2 | 11/2014 | Nishida et al. | |
| 9,030,972 | B2* | 5/2015 | Horneman | H04W 72/042 |
| | | | | 370/280 |
| 9,049,588 | B2* | 6/2015 | Choi | H04W 8/245 |
| 2010/0267388 | A1* | 10/2010 | Olsson | H04W 36/38 |
| | | | | 455/436 |
| 2011/0170517 | A1* | 7/2011 | Bakker | H04W 36/0033 |
| | | | | 370/331 |

(Continued)

FOREIGN PATENT DOCUMENTS

| CN | 101370228 A | 2/2009 |
|---|---|---|
| WO | 2012174938 A1 | 12/2012 |
| WO | 2017020035 A1 | 2/2017 |

*Primary Examiner* — Jean Gelin
(74) *Attorney, Agent, or Firm* — Spruson & Ferguson (Hong Kong) Limited

(57) ABSTRACT

A gateway (GW) acquires an International Mobile Subscriber Identity (IMSI) of a user equipment (UE) without requesting a mobile management entity (MME) of a core network (CN) to provide it. The GW detects arrival of a S1AP message for the UE. If the GW does not have the IMSI of the UE, and if a NAS payload of the S1AP message is ciphered, send to the UE a rejecting message indicating detaching the UE from the CN, causing the UE to request re-attaching to the CN in a S1AP message that is an Initial UE Message, which contains a temporary identifier of the UE. Then alter the Initial UE Message with a fabricated temporary identifier not recognizable by the MME and send the altered message to the MME, causing the MME to ask the UE to identify itself with the IMSI, which is read by the GW.

20 Claims, 12 Drawing Sheets

(56) References Cited

U.S. PATENT DOCUMENTS

| | | | |
|---|---|---|---|
| 2011/0280217 A1* | 11/2011 | Drevon | H04W 48/18 |
| | | | 370/331 |
| 2014/0242948 A1 | 8/2014 | Glasberg et al. | |
| 2016/0007138 A1* | 1/2016 | Palanisamy | H04W 4/70 |
| | | | 455/41.2 |
| 2016/0095036 A1* | 3/2016 | Stojanovski | H04W 4/08 |
| | | | 370/331 |
| 2016/0227471 A1* | 8/2016 | De Foy | H04W 48/18 |
| 2016/0255492 A1* | 9/2016 | Kilgour | H04W 8/02 |
| | | | 455/435.1 |
| 2016/0286385 A1* | 9/2016 | Ryu | H04W 68/02 |
| 2016/0338032 A1* | 11/2016 | Wang | H04W 4/70 |
| 2017/0048739 A1* | 2/2017 | Jeong | H04W 4/70 |
| 2017/0311245 A1* | 10/2017 | Kuge | H04W 48/18 |
| 2017/0318452 A1* | 11/2017 | Hahn | H04W 8/20 |

\* cited by examiner

Select the fabricated temporary identifier from a set of candidate temporary identifiers, where the set of candidate temporary identifiers includes, or even consists only of, one or more invalid temporary identifiers not recognizable by the MME. ~910

FIG. 9

ACQUIRING PERMANENT IDENTIFIER OF USER EQUIPMENT BY GATEWAY IN MOBILE COMMUNICATION SYSTEM

BACKGROUND

Field of the Invention

The present invention relates to a method for acquiring a permanent identifier of a user equipment by a gateway in a mobile communication system without requesting a mobility management entity of the system to provide the permanent identifier.

Description of the Related Art

A mobile communication system has at least a radio access network (RAN) and a core network (CN), where a user equipment (UE) wirelessly communicates with the CN through the RAN. In one scenario, a gateway (GW) is installed between the RAN and the CN such that message and data transmission between the RAN and the CN is controlled by the GW. Having the GW in between the RAN and the GW can provide certain advantages in mobile edge computing, in particular when the GW is implemented as an offloading GW. The offloading GW may be connected to the Internet via a data network operated by another telecommunication operator rather than a mobile communication operator that owns the CN. Furthermore, the offloading GW may advantageously provide value-added services without using resources of the CN. In one example, the offloading GW provide services only to a limited number of base stations (BSs) and the UE can access certain applications provided by the offloading GW only when the UE is connected to the aforesaid limited number of BSs.

Nonetheless, some applications stored or executed within the offloading GW, or the GW in general, may need to obtain a permanent identifier of the UE, typically an International Mobile Subscriber Identity (IMSI), from time to time for various purposes such as accounting, applying user-specific security control and policy, and providing differentiating features (e.g., access control, different levels of quality of service) based on the IMSI. In a typical mobile communication system, such as a 3GPP-compliant system, the IMSI is seldom transmitted from the UE to the CN. Instead, a temporary identifier, such as a Globally Unique Temporary Identity (GUTI) employed in the 3GPP-compliant system, is used in most of the times to identify the UE during communication between the UE and the CN. The GW may not be able to obtain the permanent identifier during signaling and data exchanges between the UE and the CN because the temporary identifier is used and also because messages in signaling and data exchanges are usually ciphered.

The CN generally includes a mobility management entity (MME) for managing mobility of the UE. Usually, the MME is responsible for creating the temporary identifier for the UE, and the MME stores a copy of the UE's permanent identifier. For some practical reasons, it is often not possible for the GW to directly obtain the permanent identifier from the MME. It is desirable to seek for an alternative way to acquire the IMSI without requesting the MME to provide the IMSI. Methods disclosed in U.S. Pat. No. 8,885,608 and U.S. Pat. No. 8,498,608 allow a GW to obtain the IMSI without the GW requesting the MME to provide the IMSI. However, the method disclosed in U.S. Pat. No. 8,885,608 has a pre-requisite that the MME restarts from failure, and the method of U.S. Pat. No. 8,498,608 has a similar pre-requisite that network failure has occurred. Deliberately causing a failure in the MME or in the network in order to obtain the IMSI is not recommended in practice.

There is a need in the art for a technique to enable the GW to acquire the permanent identifier of the UE without requesting the MME to provide the permanent identifier and without triggering a failure at the MME or the CN.

SUMMARY OF THE INVENTION

One aspect of the present invention is to provide a method for acquiring a permanent identifier of a UE by a GW in a mobile communication system without the GW requesting the MME to provide the permanent identifier. The mobile communication system comprises a RAN, a CN and the GW. The UE communicates control messages and data traffic with the CN through the RAN. Message and data transmission between the RAN and the CN is made through the GW. The CN includes a MME for managing mobility of the UE. The MME is configured to create a temporary identifier for replacing the permanent identifier in message and data transmission. The method is performed by the GW.

In the method, the GW identifies, among the control messages arrived at the GW, a first control message that requests the MME to attach the UE to the CN, where the first control message contains the temporary identifier for identifying the UE by the MME. The GW then forms a second control message from the first control message by at least altering the temporary identifier contained in the first control message to a fabricated temporary identifier that prevents the MME from successfully identifying a known UE upon receipt of the second control message. The second control message is sent to the MME without relaying the first control message thereto, causing the MME to issue to the UE a third control message that requests the UE to provide the permanent identifier to the MME for identification. The GW then detects arrival of a fourth control message at the GW, where the fourth control message is prepared by the UE in response to receipt of the third control message and contains the permanent identifier. The GW extracts the permanent identifier from the fourth control message received at the GW. It follows that the GW acquires the permanent identifier without requesting the MME to provide the permanent identifier.

Preferably, the method further comprises additional steps for triggering the UE to send the first control message to the MME when the UE already attaches to the CN. These additional steps are illustrated as follows. The GW identifies, among the control messages arrived at the GW, a fifth control message that is sent from the UE and that includes a request for performing a mobility procedure. The GW also blocks the fifth control message from further propagation outside the GW. The GW sends to the UE a sixth control message in response to the fifth control message, wherein the sixth control message contains a rejection to the request and an indication of detaching the UE from the CN, causing the UE to issue the first control message to the MME for requesting re-attaching to the CN.

Advantageously, the GW is used as an offloading GW for offloading a selected portion of data traffic to a local server or a data network other than the CN.

Another aspect of the present invention is to provide a GW that implements an embodiment of the method disclosed above such that the GW acquires the permanent identifier without requesting the MME to provide the permanent identifier.

The GW comprises: one or more transceivers for communicating with the RAN and the CN; and one or more processors for processing the control messages arrived at the GW. In particular, the one or more processors are configured to execute a process for acquiring the permanent identifier. The acquiring process comprises the following actions. Among the control messages arrived at the GW, identify a first control message that requests the MME to attach the UE to the CN, wherein the first control message contains the temporary identifier for identifying the UE by the MME. Form a second control message from the first control message by at least altering the temporary identifier contained in the first control message to a fabricated temporary identifier that prevents the MME from successfully identifying a known UE upon receipt of the second control message. Configure the one or more transceivers to send the second control message to the MME without relaying the first control message thereto, causing the MME to issue to the UE a third control message that requests the UE to provide the permanent identifier to the MME for identification. Detect arrival of a fourth control message at the GW, wherein the fourth control message is prepared by the UE in response to receipt of the third control message and contains the permanent identifier. Extract the permanent identifier from the fourth control message received at the GW.

Preferably, the acquiring process further comprises a step of triggering the UE to send the first control message to the MME when the UE already attaches to the CN. The triggering step comprises the following actions. Among the control messages arrived at the GW, identify a fifth control message that is sent from the UE and that includes a request for performing a mobility procedure. Configure the one or more transceivers to block the fifth control message from further propagation outside the GW. Further configure the one or more transceivers to send to the UE a sixth control message in response to the fifth control massage, wherein the sixth control message contains a rejection to the request and an indication of detaching the UE from the CN, causing the UE to issue the first control message to the MME for requesting re-attaching to the CN.

In case the GW is used as an offloading GW, the one or more transceivers are further used for communicating with a unit selected from a local server and a data network, the data network being other than the CN. In addition, the one or more processors are further configured to execute a process for offloading a selected portion of data traffic to the selected unit. The offloading process includes configuring the one or more transceivers to relay the selected portion of data traffic between the RAN and the selected unit.

Yet another aspect of the present invention is to provide a method for collecting IMSIs of UEs by a GW in a 3GPP-compliant system without the GW requesting the MME to provide the IMSIs. An individual UE is identifiable by a MME UE S1AP ID or an eNB UE S1AP ID of the individual UE. The GW has a local database for storing plural mappings. Each mapping comprises a first entry of MME UE S1AP ID, a second entry of eNB UE S1AP ID and a third entry of IMSI.

The method performed by the GW is provided as follows. First, detect, at the GW, arrival of a first S1AP message that is addressed to a MME of the 3GPP-compliant system, wherein the first S1AP message comprises (1) a NAS payload of a first UE, and (2) the eNB UE S1AP ID of the first UE, or both of the eNB UE S1AP ID and the MME UE S1AP ID of the first UE, as identification information of the first S1AP message. Check whether the first UE has a corresponding mapping in the database. If the first UE has the corresponding mapping, update the corresponding mapping according to identification information of the first S1AP message. If the first UE does not have any corresponding mapping in the database, check whether the NAS payload is ciphered. If the NAS payload is ciphered, send to the first UE a second S1AP message of rejecting a request contained in the first S1AP message. If the NAS payload is not ciphered, check whether the NAS payload contains an IMSI of the first UE. If the NAS payload contains the IMSI, update the database with a new mapping according to the MME UE S1AP ID, the eNB UE S1AP ID and the IMSI contained in the first S1AP message. If the NAS payload does not contain the IMSI, alter a temporary identifier created by the MME for identifying the first UE and contained in the first S1AP message to a fabricated temporary identifier that prevents the MME from successfully identifying a known UE based on the fabricated temporary identifier. After the temporary identifier contained in the first S1AP message is altered, relaying to the MME the first S1AP message altered with the fabricated temporary identifier.

Other aspects of the present invention are disclosed as illustrated by the embodiments hereinafter.

BRIEF DESCRIPTION OF THE DRAWINGS

FIG. 9 depicts optional steps in the method illustrated by FIG. 6, these optional steps being used to facilitate determination of a fabricated temporary identifier in accordance with another embodiment of the present invention.

DETAILED DESCRIPTION

3GPP specifications are occasionally cited hereinafter. As used herein, "a 3GPP-compliant system" is a mobile communication system compliant to one or more 3GPP specifications.

Herein in the specification and appended claims, a UE "attaching to" a CN of a mobile communicating system means that the UE is registered to the CN so as to be eligible to use services (such as packet data services) provided by the mobile communication system. For example, in a 3GPP-compliant system, the UE is attached to the CN when the UE is in the EMM-REGISTERED state, where this state is reached from the EMM-DEREGISTERED state after the UE performs an Attach procedure (Subclauses 5.1.3.2.2.2, 5.1.3.2.2.4 and 5.5.1.1 of 3GPP TS 24.301).

It is also used herein that a UE "detaching" from the CN has a meaning opposite to the UE attaching to the CN. As an example, the UE is detached from the CN in a 3GPP-compliant system when the UE is in the EMM-DEREGISTERED state (Subclause 5.1.3.2.2.2 of 3GPP TS 24.301).

Figure 1:
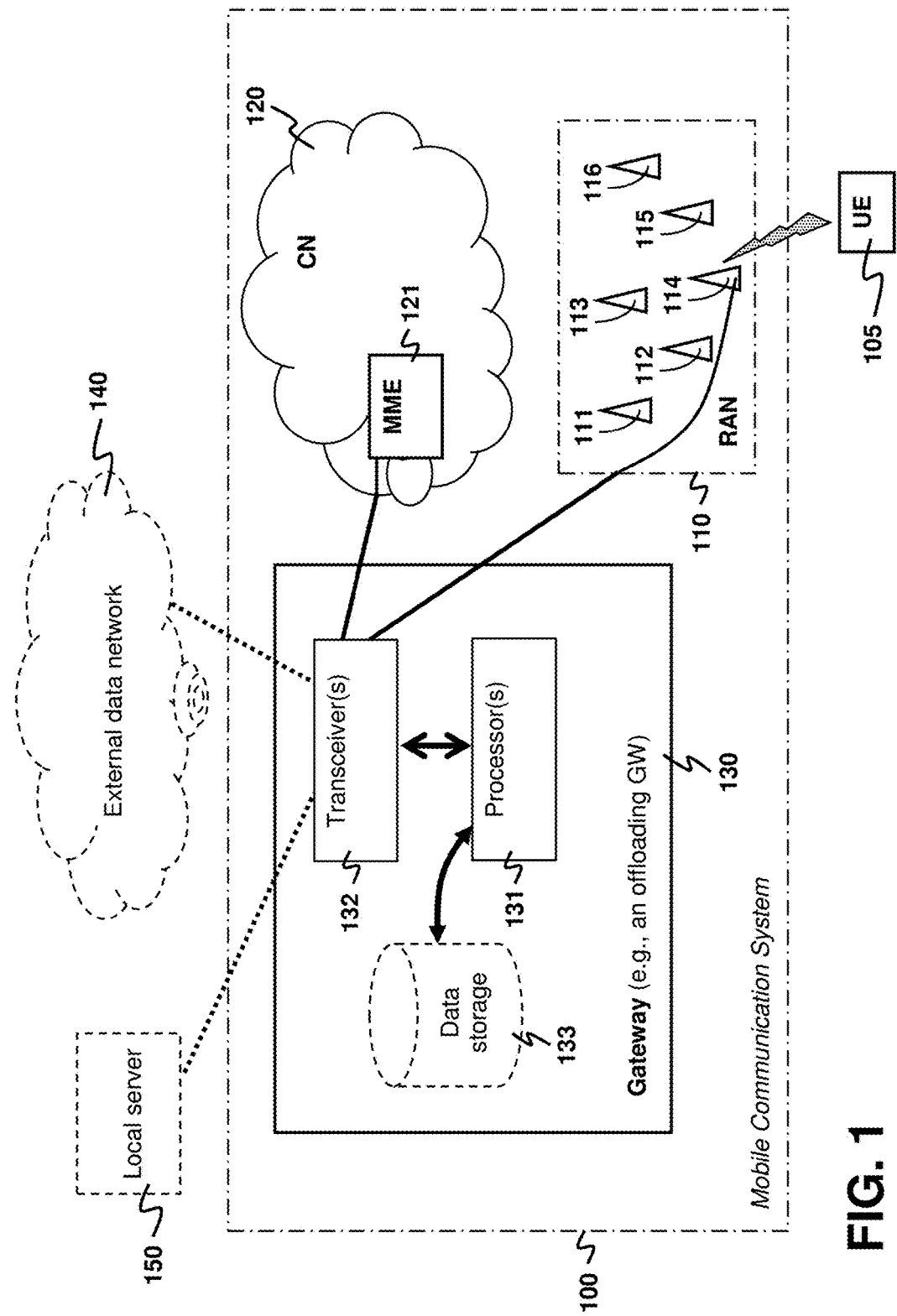
FIG. 1 depicts a mobile communication system used for developing the present invention, and includes a schematic structure of a GW.

The setting under which the present invention is developed is shown in FIG. 1, which depicts a mobile communication system 100 comprising a RAN 110, a CN 120 and a GW 130. The RAN 110 includes a plurality of BSs 111-116 for wirelessly communicating with a UE 105 and for supporting mobility of the UE 105 (by distributing the BSs 111-116 over an intended radio coverage area to set up a plurality of cells). The GW 130 is arranged to be between the RAN 110 and the CN 120 such that message and data transmission between the RAN 110 and the CN 120 is made through the GW 130. The CN 120 includes a MME 121 for managing mobility of the UE 105.

The present invention includes providing (1) a method for acquiring a permanent identifier of a UE by a GW in a mobile communication system, and (2) the GW that employs this method. Although the present invention is hereinafter described in embodiments predominantly based on an exemplary mobile communication system that is a 3GPP-compliant system, it is not intended that applications of the present invention are limited only to 3GPP-compliant systems. The present invention may be used for a general mobile communication system having a RAN and a CN with a GW between the RAN and the CN. The present invention is applicable when the GW is an offloading GW. The present invention further includes (3) providing a method for collecting permanent identifiers of UEs by a GW in a 3GPP-compliant system.

The present invention is developed by first considering a specific example of acquiring an IMSI by a GW in a 3GPP-compliant system. In this example, the RAN is an Evolved UMTS Terrestrial Radio Access Network (E-UTRAN), the CN is an Evolved Packet Core (EPC), and a BS in the RAN is an eNodeB. In particular, Evolved Packet System (EPS) mobility management (EMM) and EPS connection management (ECM) of the 3GPP-compliant system are considered. EMM is concerned with mobility management of the UE by the EPC, in particular by the MME. ECM is concerned with signaling connectivity between the UE and the EPC.

In explaining details of the invention hereinafter, the following technical terms employed in the 3GPP-compliant system are occasionally used.

Non-Access Stratum (NAS) refers to signaling between the UE and the EPC. A NAS message or a NAS signaling message is a control message and is not used for transmitting application data.

Access Stratum (AS) refers to signaling between E-UTRAN and EPC. In Long Term Evolution (LTE), the AS signaling is specified by S1 Application Protocol (S1AP) in 3GPP TS 36.413. A signaling message between E-UTRAN and EPC is a S1AP message. Each S1AP message is a control message.

Figure 10A:
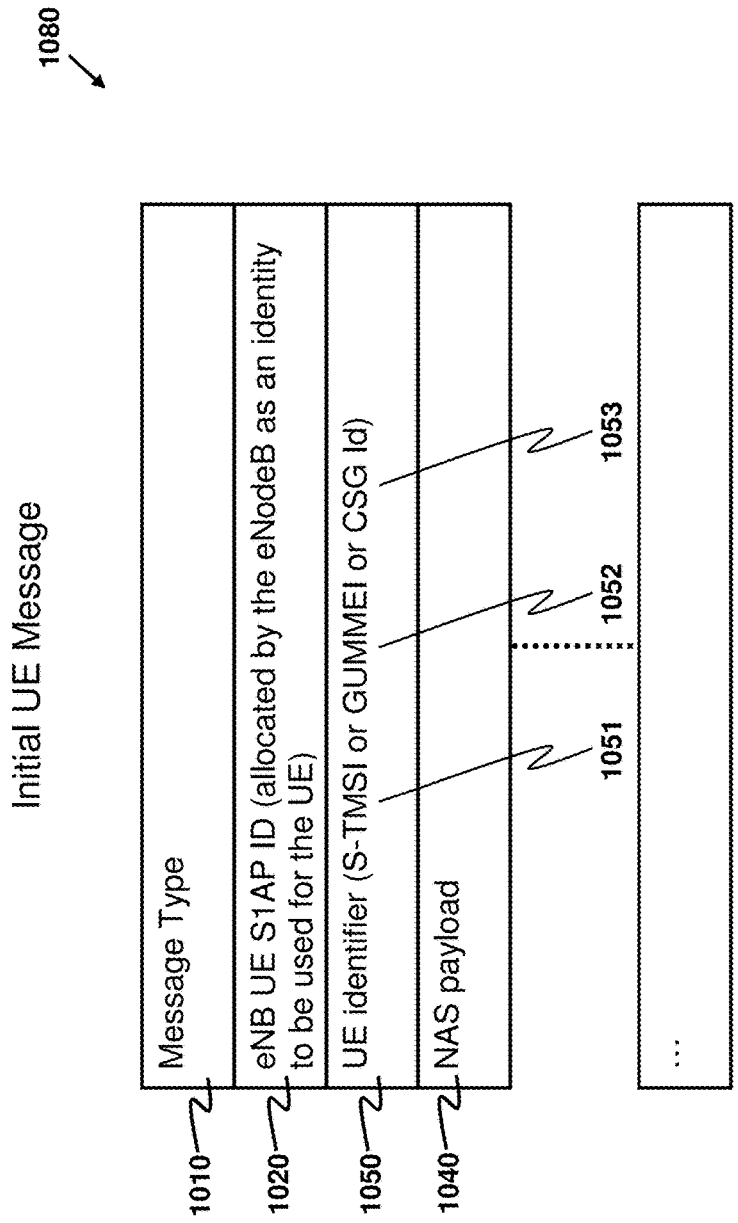
FIG. 10A depicts an abridged format of an Initial UE Message.

One type of S1AP messages is an Initial UE Message. For illustration, FIG. 10A depicts an abridged format of an Initial UE Message 1080. When the eNodeB has received from a radio interface the first uplink NAS message to be forwarded to the MME, the eNodeB sends the Initial UE Message 1080 to the MME including the NAS message generated by a UE as a NAS payload 1040. The Initial UE Message 1080 includes a Message Type 1010. The eNodeB allocates a unique eNB UE S1AP ID 1020 as an identity to be used for the UE and includes this identity in the Initial UE Message 1080. In the Initial UE Message 1080, the eNodeB also includes a UE identifier 1050. Depending on which type of identifier is received by the eNodeB from the radio interface, the UE identifier 1050 may be a SAE-Temporary Mobile Subscriber Identity (S-TMSI) 1051, a Globally Unique MME Identifier (GUMMEI) 1052 or a Closed Subscriber Group (CSG) Identifier 1053.

Figure 10B:
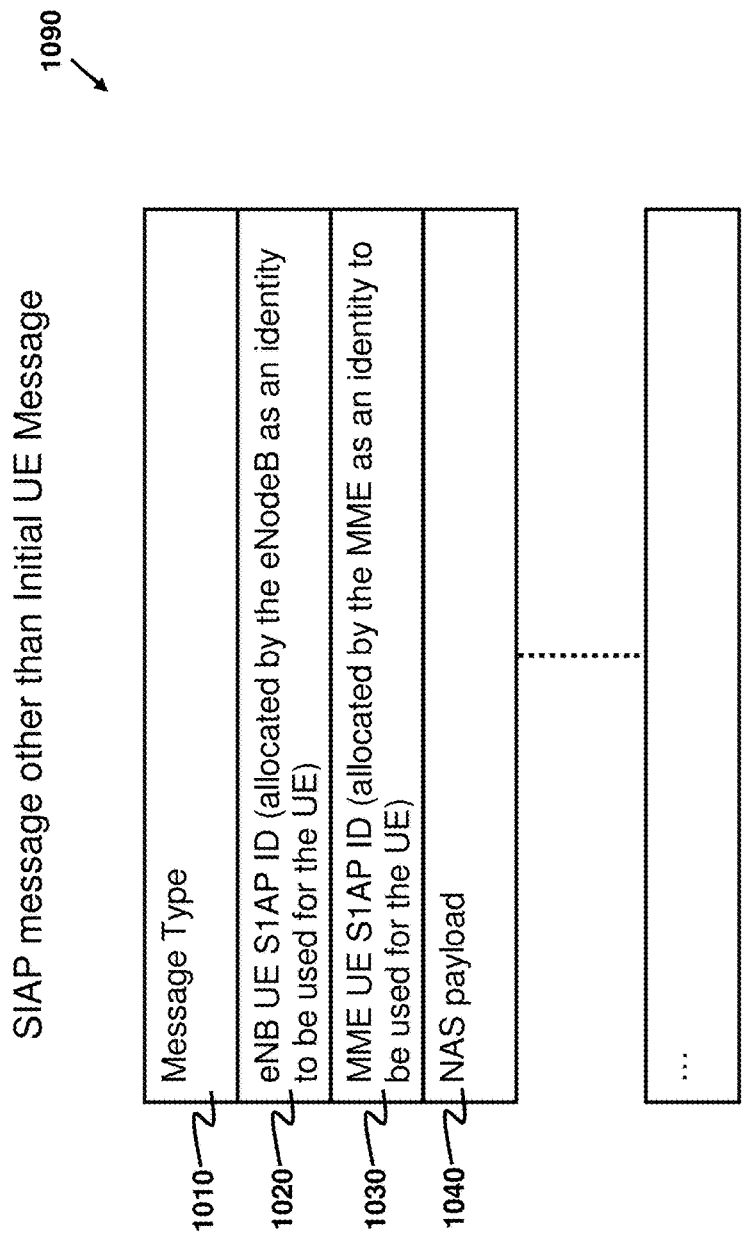
FIG. 10B depicts an abridged format of a S1AP message other than the Initial UE Message.

FIG. 10B depicts an abridged format of a S1AP message 1090 other than the Initial UE Message 1080. Again, the S1AP message 1090 includes the Message Type 1010, the NAS payload 1040 and the eNB UE S1AP ID 1020. This S1AP message 1090 is obtained at a time after the MME processes the Initial UE Message 1090. At that time, the MME has allocated a unique MME UE S1AP ID 1030 as an identity to be used for the UE. The MME UE S1AP ID 1030 is included in the S1AP message 1090.

Figure 11:
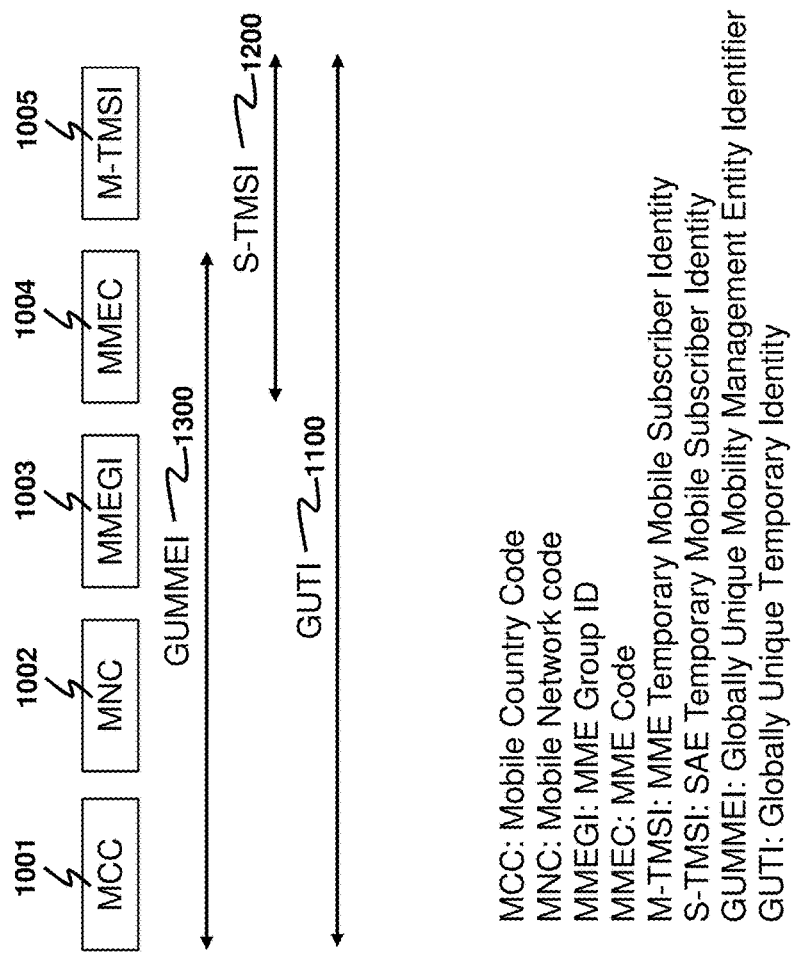
FIG. 11 illustrates structures of different types of UE identifiers as used in a 3GPP-compliant system.

For any S1AP message (1080 or 1090), the NAS payload 1040 may be ciphered or unciphered. The NAS message generated by the UE and put in the NAS payload 1040 identifies the UE usually by a GUTI. The GUTI and the S-TMSI are temporary identifiers that identify the same UE. FIG. 11 depicts structures of GUTI, S-TMSI and GUMMEI, and illustrates interrelationships thereof. Details of the structures can be found in 3GPP TS 23.003. A S-TMSI 1200 is composed of a MME Code (MMEC) 1004 and a MME Temporary Mobile Subscriber Identity (M-TMSI) 1005. A GUMMEI 1300 is composed of a Mobile Country Code (MCC) 1001, a Mobile Network code (MNC) 1002, a MME Group ID (MMEGI) 1003 and the MMEC 1004. A GUTI 1100 is composed of the MCC 1001, the MNC 1002, the MMEGI 1003, the MMEC 1004 and the M-TMSI 1005. Note that the GUTI 1100 and the S-TMSI 1200 both contain the M-TMSI 1005. The M-TMSI 1005 is used as a temporary identifier that identifies the UE within the MME (Subclause 2.8.1 of 3GPP TS 23.003). Herein in the specification and appended claims, the GUTI 1100 and the S-TMSI 1200 are regarded as the same temporary identifier that uniquely identifies the UE.

Figure 2:
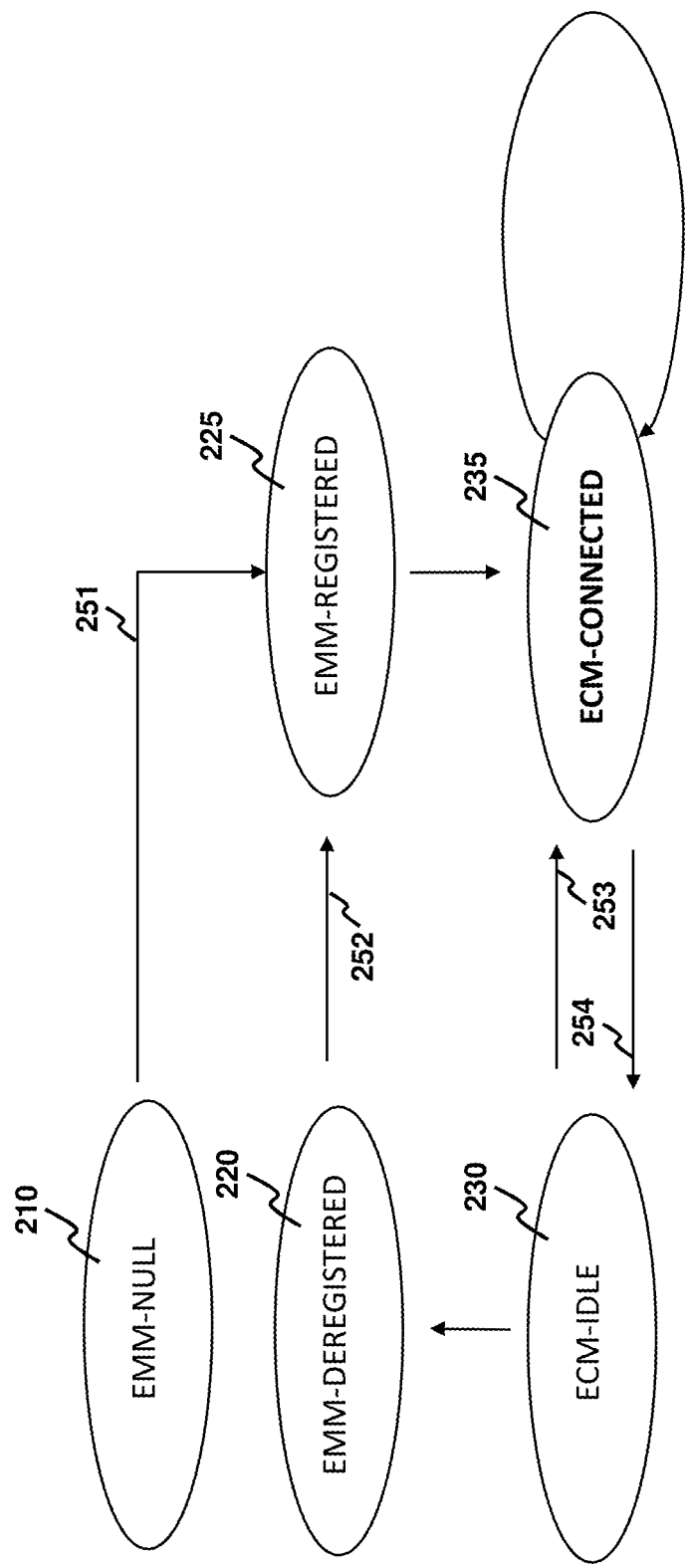
FIG. 2 depicts various states of the UE in connection with mobility management and connection management for the 3GPP-compliant system.

FIG. 2 depicts various states of the UE under EMM and ECM according to 3GPP TS 24301.

In the EMM-NULL state 210, the EPS capability is disabled in the UE and no EMM function can be performed.

In the EMM-DEREGISTERED state 220, the UE location is unknown to the MME and hence the UE is unreachable by the MME.

In the EMM-REGISTERED state 225, the UE location is known to the MME and the MME has allocated a GUTI to the UE.

In the ECM-IDLE state 230, no NAS signaling connection between the UE and the EPC exists. The UE location is known to the MME with an accuracy of a list of tracking areas containing a certain number of tracking areas. The UE is in this state when the UE does not have application data to communicate with the EPC.

In the ECM-CONNECTED state 235, the UE has an active signaling connection to the MME. The UE location is known to the MME with an accuracy of a serving eNodeB. The UE remains in this state during transmission of application data to or from the EPC.

A transition of states may be initiated by the UE or by the MME. Each state transition is triggered by initiating a certain procedure.

To trigger a transition 251 from the EMM-NULL state 210 to the EMM-REGISTERED state 225, the UE initiates an Attach Procedure (Subclause 5.5.1 of 3GPP TS 24.301). In the procedure, an Initial UE Message having a NAS payload containing an attach request is sent from the eNodeB to the MME. The NAS payload is unciphered (Subclause 4.4.4.3 of 3GPP TS 24 301).

To trigger a transition 252 from the EMM-DEREGISTERED state 220 to the EMM-REGISTERED state 225, the UE also initiates an Attach Procedure (Subclause 5.5.1 of 3GPP TS 24.301). Similarly, an Initial UE Message having a NAS payload containing an attach request is sent from the eNodeB to the MME in the procedure, and the NAS payload is unciphered.

To trigger a transition 253 from the ECM-IDLE state 230 to ECM-CONNECTED state 235, the UE initiates a Tracking Area Update Procedure (Subclause 5.5.3 of 3GPP TS 24.301) or a Service Request Procedure (Subclause 5.6.1 of 3GPP TS 24.301).

The inventors have found the following approach to obtain the IMSI. Subclause 5.4.2.7(c) of 3GPP TS 24 301 has a provision to enable the EPC to request the UE to provide the IMSI when an authentication failure occurs. An IDENTITY REQUEST requesting for the IMSI is then sent to the UE. Subclause 4.4.4.3 of 3GPP TS 24 301 indicates that an IDENTITY RESPONSE containing the IMSI is exempted from being under secure message exchange. That is, the IDENTITY RESPONSE containing the IMSI, in response to the IDENTITY REQUEST, is not ciphered when transported in the NAS payload of a S1AP message. By modifying the temporary identifier of the UE in an Initial UE Message to trigger an authentication failure, the GW can read the unciphered IDENTITY RESPONSE to obtain the IMSI. As mentioned above, the Initial UE Message is transmitted from an eNodeB to the MME when the UE initiates an Attach Procedure. The Initial UE Message is intercepted by the GW and the GW modifies the temporary identifier of the UE contained in the Initial ME Message. As mentioned above, GUTI and S-TMSI identify the same UE as they have the same M-TMSI components. The temporary identifier refers to GUTI, or a collection of GUTI and S-TMSI if used in the Initial UE Message.

Figure 3:
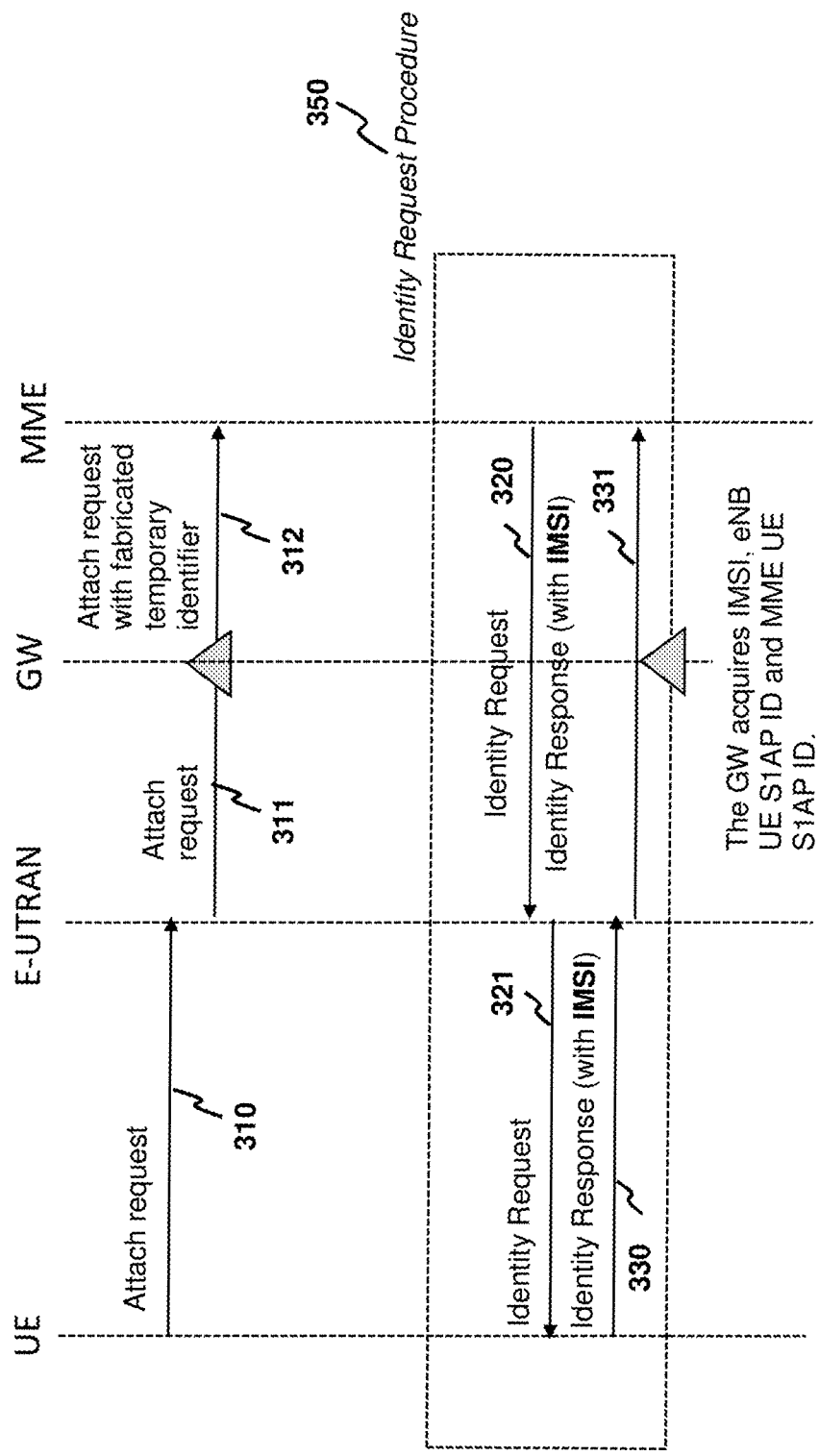
FIG. 3 depicts, in accordance with one embodiment of the present invention, a message flow diagram of message transmission among the UE, the E-UTRAN, a GW and the MME for triggering the UE to send out the IMSI such that the GW is enabled to acquire the IMSI, where the UE initiates a procedure of transiting from the EMM-DEREGISTERED state to the EMM-REGISTERED state.

Exemplarily, an implementation of the aforementioned approach in obtaining the IMSI is shown in FIG. 3, which depicts a message flow diagram for message transmission between the UE and the MME via the E-UTRAN and the GW. When the UE desires to transit from the EMM-DEREGISTERED state 220 to the EMM-REGISTERED state 225, the UE initiates the Attach Procedure by sending an uplink NAS message 310 that will become an Initial UE Message 311 to the E-UTRAN. The E-UTRAN forms the Initial UE Message 311 by incorporating the uplink NAS message 310 as the NAS payload without ciphering, and transmits the Initial UE Message 311 to the MME. The GW intercepts the Initial UE Message 311. The temporary identifier contained in the Initial UE Message 311 is altered to another temporary identifier where the MME is unable to map the altered temporary identifier to an IMSI of any UE known to the MME. The altered temporary identifier may be, for example, a valid temporary identifier different from any of temporary identifiers already assigned by the MME, or an invalid temporary identifier not recognizable by the MME. As a result, an altered Initial UE Message 312 is formed. The GW sends the altered Initial UE Message 312 to the MME, triggering an authentication failure at the MME and causing the MME to perform an Identity Request Procedure 350. The MME sends a S1AP message 320 containing an IDENTITY REQUEST in the NAS payload to the E-UTRAN. The IDENTITY REQUEST asks the UE to identify itself by sending the IMSI to the MME. At the E-UTRAN, the E-UTRAN forms a downlink NAS message 321 containing the IDENTITY REQUEST, and wirelessly sends the downlink NAS message 321 to the UE. Upon receiving the downlink NAS message 321, the UE sends an uplink NAS message 330 containing an unciphered IDENTITY RESPONSE to the E-UTRAN, where the unciphered IDENTITY RESPONSE contains the IMSI. The E-UTRAN forms a S1AP message 331 containing the unciphered IDENTITY RESPONSE in the NAS payload, and forwards the S1AP message 331 to the MME. When the S1AP message 331 passes through the GW, the GW reads the IMSI contained in the NAS payload of the S1AP message 331, thereby enabling the GW to acquire the IMSI. Furthermore, the GW is capable of extracting eNB UE S1AP ID and MME UE S1AP ID from the S1AP message 331. Each of eNB UE S1AP ID and MME UE S1AP ID uniquely identifies the UE. By storing eNB UE S1AP ID, MME UE S1AP ID and the IMSI as a mapping, the GW not only acquires the IMSI but also associates the acquired IMSI with the UE.

Refer to FIG. 2. The UE can only transmit data traffic at the ECM-CONNECTED state 235. When the UE does not need to transmit data, it changes to the ECM-IDLE state 230. If the GW is used as an offloading GW, the offloading GW only offloads data traffic at the ECM-CONNECTED state 235. It is desired for the offloading GW to acquire the IMSI when the UE is in the ECM-CONNECTED state 235.

The transition 254 from the ECM-CONNECTED state 235 to the ECM-IDLE state 230 by sending, to the eNodeB that connects to the UE, the UE CONTEXT RELEASE COMMAND (Subclause 8.3.3.2 of 3GPP TS 36.413) releases the eNB UE S1AP ID and MME UE S1AP ID, thereby removing the mapping with the IMSI and the associated UE. It is because in the subsequent procedure initiated by the UE to transit from the ECM-IDLE state 230 back to the ECM-CONNECTED state 235, the S1AP message formed by such procedure is an Initial UE Message with a new eNB UE S1AP ID, and the NAS payload is ciphered. The mapping to IMSI and the associated UE needs to be reestablished. To obtain the IMSI by the procedure shown in FIG. 3, one approach is to drive the UE to transit from the ECM-CONNECTED state 235 directly to the EMM-DEREGISTERED state 220.

Figure 4:
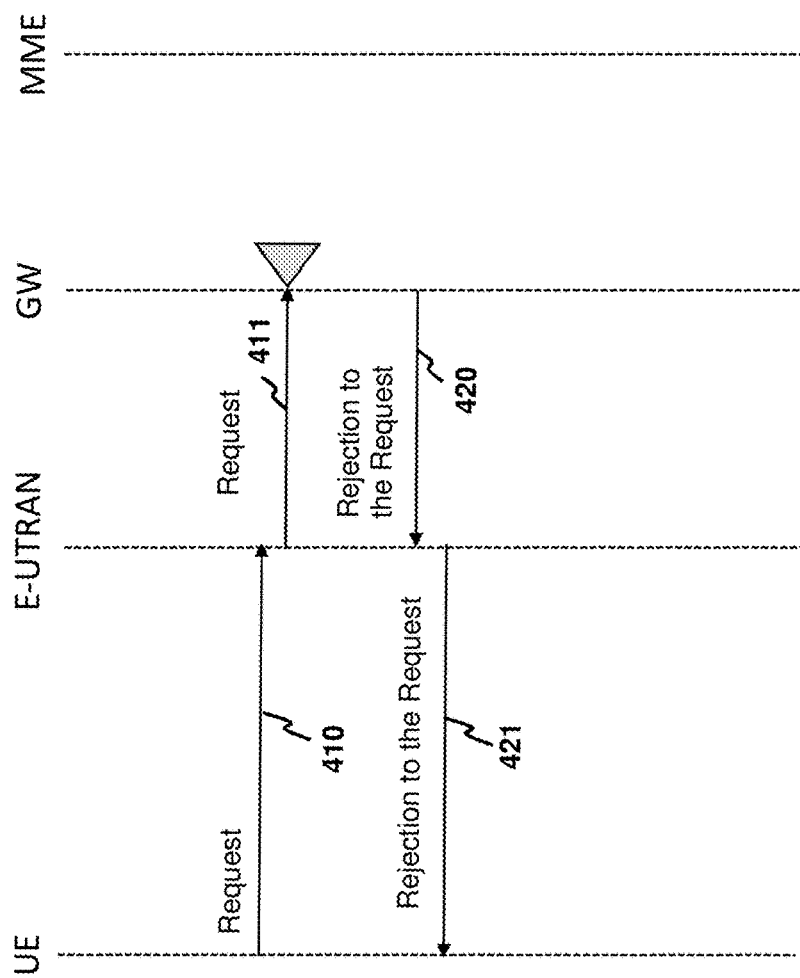
FIG. 4 depicts, in accordance with one embodiment of the present invention, a message flow diagram of message transmission among the UE, the E-UTRAN, the GW and the MME for triggering the ECM-CONNECTED state directly to the EMM-DEREGISTERED state such that the GW is enabled to acquire the IMSI by subsequently using the approach shown in FIG. 3.

The procedure to trigger this transition is elaborated as follows with the aid of FIG. 4, which depicts a message flow diagram of triggering this transition in accordance with one embodiment of the present invention. According to Subclause 5.5.3.2 of 3GPP TS 24 301, the UE is required to regularly perform a Tracking Area Update Procedure to update the MME about the mobility status of the UE (e.g., the occurrence of handover) by at least periodically sending a TRACKING AREA UPDATE REQUEST message to the MME. In FIG. 4, the UE sends an uplink NAS message 410 containing the TRACKING AREA UPDATE REQUEST to the MME through the E-UTRAN. The eNodeB that receives the uplink NAS message 410 formats the TRACKING AREA UPDATE REQUEST into a S1AP message 411 and sends the S1AP message 411 to the MME. In the mid-way to the MME, the GW intercepts the S1AP message 411 and blocks this message from further forwarding to the MME. The GW rejects the TRACKING AREA UPDATE REQUEST by sending a S1AP message 420 containing a TRACKING AREA UPDATE REJECT to the UE. To trigger the UE to directly switch to the EMM-DEREGISTERED state 220, the TRACKING AREA UPDATE REJECT incorporates an EMM cause #10 "implicitly detached", indicating to the UE that the UE is forced to detach from the EPC. See Subclause 5.5.3.2.5 of 3GPP TS 24.301. The S1AP message 420 received at the eNodeB is formatted into a downlink NAS message 421 containing the TRACKING AREA UPDATE REJECT for delivery to the UE. When the UE receives the downlink NAS message 421, the UE changes its state to the EMM-DEREGISTERED state 220.

As an option, the GW may acquire the IMSI when the UE has new application data to be sent to the EPC and wishes to switch from the ECM-IDLE state 230 to the ECM-CONNECTED state 235. In this regard, the UE initiates a Service Request Procedure and sends an uplink control message containing a SERVICE REQUEST or an EXTENDED SERVICE REQUEST to the MME. See Subclause 5.6.1.1 of 3GPP TS 24.301. Forcing the UE to switch to the EMM-DEREGISTERED state 220 follows the details of procedure mentioned above for describing FIG. 4 except that the TRACKING AREA UPDATE REJECT is replaced with a SERVICE REJECT (Subclause 5.6.1.5 of 3GPP TS 24.301). Note that the SERVICE REJECT also incorporates an EMM cause #10 "implicitly detached" to force the UE to detach from the EPC.

Figure 5:
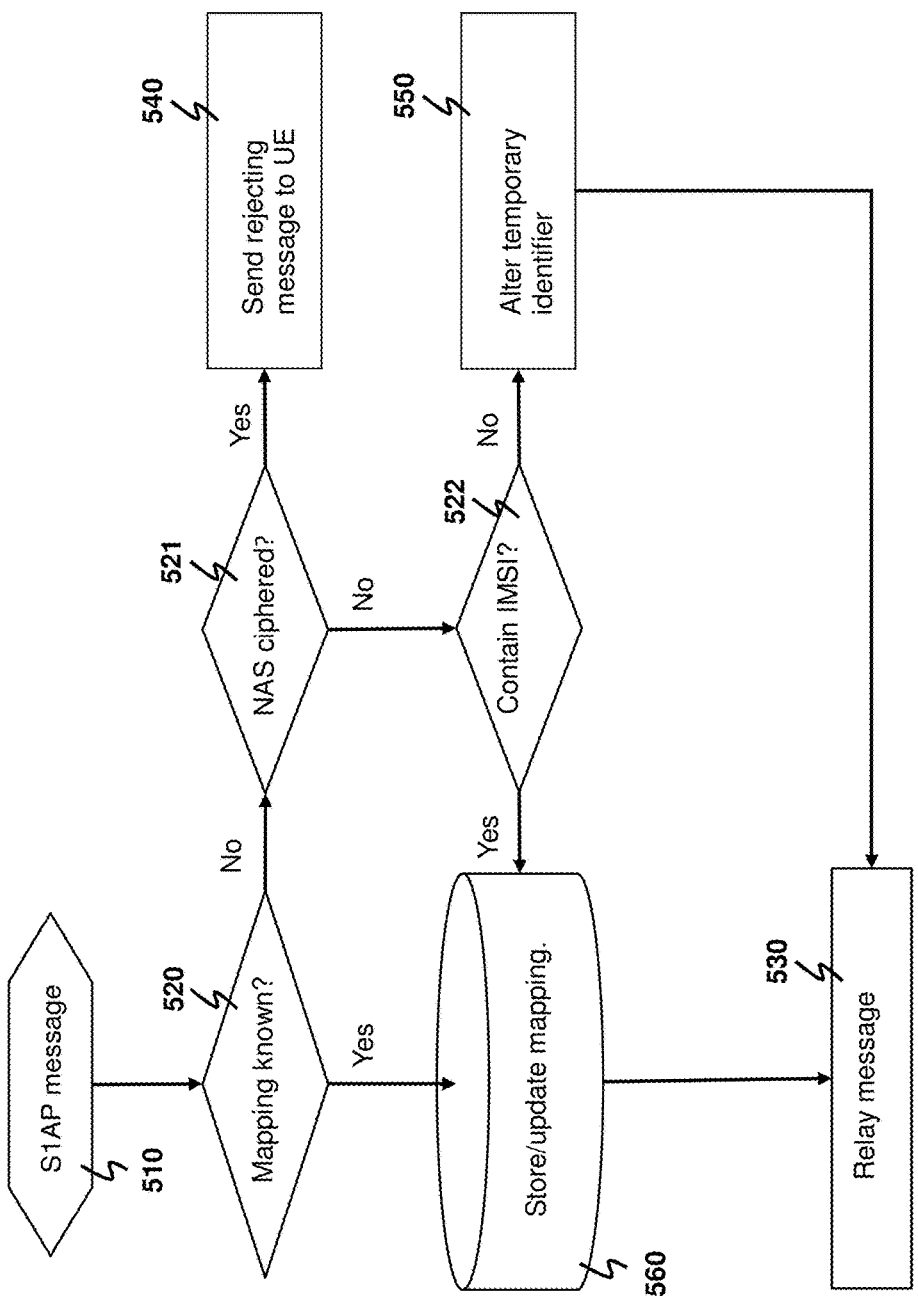
FIG. 5 depicts a flowchart for exemplarily illustrating a method for a GW to collect or acquire IMSIs of UEs.

In a first aspect of the present invention, it is provided with a method for a GW in a 3GPP-compliant system to collect or acquire IMSIs of UEs according to the details disclosed above. One advantage of the GW as disclosed herein is that the GW needs not request the MME to provide the IMSIs. The GW has a local database for storing plural mappings obtained from the acquired IMSIs. Since an individual UE is identifiable by a MME UE S1AP ID or an eNB UE S1AP ID, each mapping comprises a first entry of MME UE S1AP ID, a second entry of eNB UE S1AP ID and a third entry of IMSI. FIG. 5 depicts a flowchart for exemplarily illustrating the method for collecting or acquiring the IMSIs.

In the method, the GW detects arrival of a first S1AP message that is addressed to a MME of the 3GPP-compliant system (step 510). The first S1AP message has a NAS payload. The NAS payload contains a NAS message of a certain UE, regarded as a first UE for convenience. As contained in the first S1AP message, the eNB UE S1AP ID of the first UE, or both of the eNB UE S1AP ID and the MME UE S1AP ID of the first UE, are regarded as identification information of the first S1AP message.

For the first S1AP message, the GW first checks whether the first UE has a corresponding mapping in the database (step 520). If it is found that the corresponding mapping is in the database, the corresponding mapping is updated according to identification information of the first S1AP message (step 560), and the S1AP message is relayed to the MME (step 530); otherwise the GW checks whether the NAS payload is ciphered (step 521).

If the NAS payload is ciphered, the GW sends to the UE a second S1AP message of rejecting a request contained in the first S1AP message (step 540). In particular, the second S1AP message further includes an indication of detaching the UE from a CN of the mobile communication system. In one embodiment, the rejecting message is a TRACKING AREA UPDATE REJECT incorporating an EMM cause #10 "implicitly detached". If the NAS payload is not ciphered, the GW checks whether the first S1AP message contains the IMSI of the first UE (step 522).

If the NAS payload contains the IMSI, since the IMSI contained therein is unciphered, the GW is able to retrieve this IMSI, and hence updates the database with a new mapping according to the MME UE S1AP ID, the eNB UE S1AP ID and the IMSI contained in the first S1AP message (step 560). The GW also relays the first S1AP message to the MME (the step 530).

If the step 522 yields a result that the NAS payload does not contain the IMSI, the GW alters a temporary identifier created by the MME for identifying the first UE and contained in the first S1AP message to a fabricated temporary identifier that prevents the MME from successfully identifying a known UE based on the fabricated temporary identifier (step 550). The temporary identifier means a collection of the GUTI, contained in the NAS payload, and the S-TMSI if present in the first S1AP message. The same M-TMSI components in both GUTI and S-TMSI are altered with a fabricated M-TMSI. The fabricated temporary identifier means a collection of the GUTI and the S-TMSI (if the S-TMSI is present in the first S1AP message) after each of the M-TMSI components is replaced by the fabricated M-TMSI. Afterwards, the first S1AP message that is altered with the fabricated temporary identifier is relayed to the MME (the step 530).

In a second aspect of the present invention, a method for acquiring a permanent identifier of a UE by a GW in a mobile communication system is provided. The method is developed based on generalizing the details disclosed above for acquiring the IMSI by the GW in the 3GPP-compliant system.

The mobile communication system under consideration comprises a RAN, a CN and the GW. The UE communicates control messages and data traffic with the CN through the RAN. Message and data transmission between the RAN and the CN is made through the GW such that the GW acts as a relay for relaying messages communicated between the RAN and the CN. The CN includes a MME for managing mobility of the UE. Furthermore, the MME is configured to create a temporary identifier for replacing the permanent identifier in message and data transmission.

Figure 6:
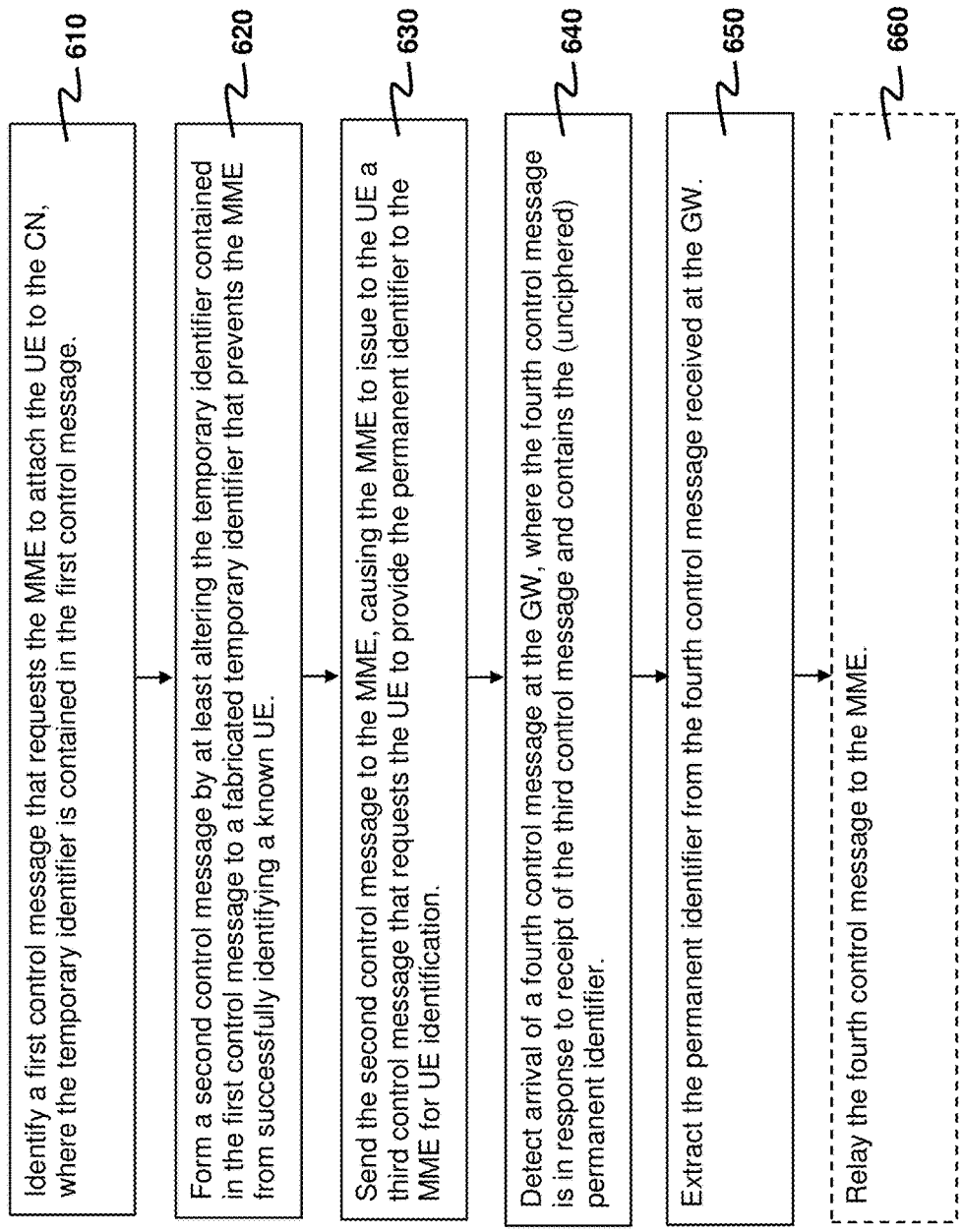
FIG. 6 depicts a flowchart for exemplarily illustrating a method for a GW to acquire a permanent identifier.

The method is exemplarily illustrated with the aid of FIG. 6, which presents a flowchart for illustrating the flow of steps performed by the GW to acquire the permanent identifier.

In the method, the GW identifies, among the control messages arrived at the GW, a first control message that requests the MME to attach the UE to the CN, where the temporary identifier contained in the first control message is unciphered and is used to identify the UE by the MME (step 610).

The GW then forms a second control message from the first control message by at least altering the temporary identifier contained in the first control message to a fabricated temporary identifier (step 620). By altering the temporary identifier in the first control message, it is understood that other parts of the first control message affected by a change of the temporary identifier, such as a message checksum for ensuring integrity of the first control message, are required to be updated accordingly in forming the second control message. The fabricated temporary identifier is designed or selected such that the MME is prevented from successfully identifying a known UE upon receipt of the second control message.

Afterwards, the GW sends the second control message to the MME without relaying the first control message thereto (step 630). Upon receipt of the second control message, the MME is caused to issue a third control message to the UE, where the third control message requests the UE to provide the permanent identifier to the MME for identification.

After the step 630 is performed, the GW detects arrival of a fourth control message at the GW (step 640). The fourth control message is prepared by the UE in response to receipt of the third control message. In addition, the fourth control message contains the permanent identifier that is unciphered.

Thereafter, the GW is able to extract the permanent identifier from the fourth control message received at the GW (step 650) because the permanent identifier is unciphered. It follows that the GW can acquire the permanent identifier without requesting the MME to provide the permanent identifier.

The fourth control message is intended to be delivered to the MME for accomplishing the request of attaching the UE to the CN. As the GW has an established function of relaying messages between the RAN and the CN, the GW forwards the fourth control message to the MME (step 660).

Figure 7:
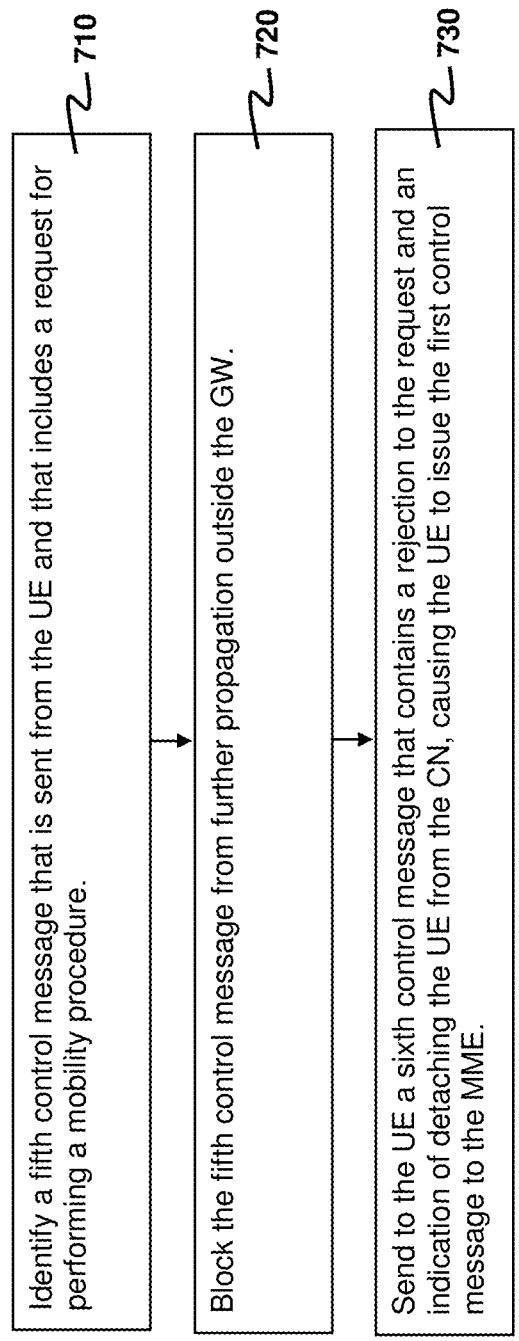
FIG. 7 depicts optional steps in the method illustrated by FIG. 6, where the optional steps are used to trigger the UE to request re-attaching to the CN when the UE already attaches to the CN.

Preferably, the method includes further steps for triggering the UE to send the first control message to the MME when the UE already attaches to the CN. FIG. 7 depicts a flowchart containing these further steps. Among the control messages arrived at the GW, the GW identifies a fifth control message that is sent from the UE and that includes a request for performing a mobility procedure (step 710). The fifth control message is blocked from further propagation outside the GW (step 720). Hence, the MME does not receive the fifth control message so that the mobility procedure as requested is not performed. The GW sends to the UE a sixth control message in response to the request of the fifth control message (step 730). The sixth control message contains a rejection to the request and an indication of detaching the UE from the CN. Upon receiving the aforementioned indication, the UE is caused to issue the first control message to the MME for requesting re-attaching to the CN.

Figure 8:
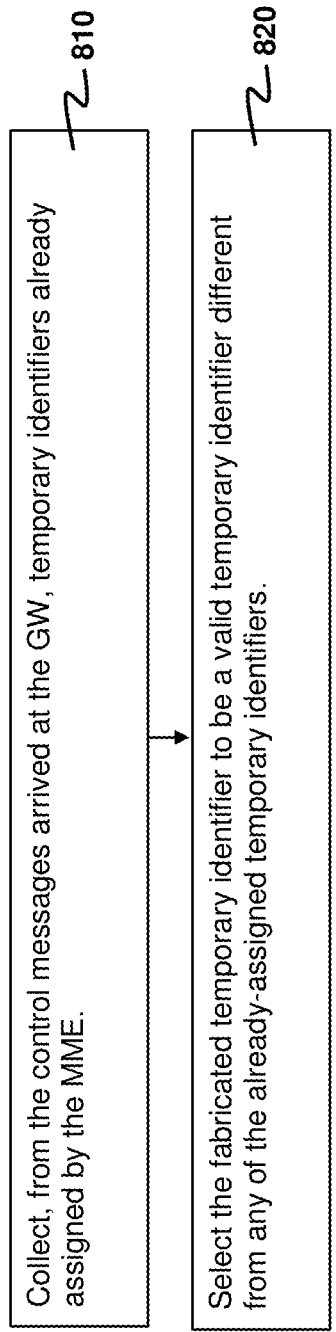
FIG. 8 depicts optional steps in the method illustrated by FIG. 6, these optional steps being used to facilitate determination of a fabricated temporary identifier in accordance with one embodiment of the present invention.

It is also preferable that the method includes further steps to facilitate determination of the fabricated temporary identifier in the step 620. FIGS. 8 and 9 show two embodiments for enabling selection of the fabricated temporary identifier. Refer to the embodiment shown in FIG. 8. The GW collects, from the control messages arrived at the GW, temporary identifiers already assigned by the MME (step 810). The fabricated temporary identifier is selected to be a valid temporary identifier different from any of the already-assigned temporary identifiers (step 820). In the embodiment shown in FIG. 9, the GW selects the fabricated temporary identifier from a set of candidate temporary identifiers, where the set of candidate temporary identifiers includes, or even consists only of, one or more invalid temporary identifiers not recognizable by the MME (step 910).

In a 3GPP-compliant system, the first control message received at the GW is an Initial UE Message. The fifth control message may be a TRACKING AREA UPDATE REQUEST transmitted as a S1AP message. In case the fifth control message is the TRACKING AREA UPDATE REQUEST, the sixth control message is a S1AP message containing a TRACKING AREA UPDATE REJECT that incorporates an EMM cause #10 "implicitly detached".

In a third aspect of the present invention, there are provided a GW that employs any of the embodiments in the first and second aspects of the present invention. A typical configuration of the GW is shown in FIG. 1.

Refer to FIG. 1. The GW 130 comprises one or more transceivers 132 and one or more (computing) processors 131. The one or more transceivers 132 are used for communicating with the RAN 110 and the CN 120 (including the MME 121). The one or more processors 131 are used for processing incoming messages arrived at the GW 130 and for configuring, or controlling, the one or more transceivers 132 to forward outgoing messages to destinations thereof.

Generally, the GW 130 further comprises one or more data-storing devices 133 (e.g. a hard disk) controllable by the one or more processors 131 for storing a database of network data collected during operation, e.g., mappings between IMSIs and UEs.

In case the GW 130 is used as an offloading GW, the one or more transceivers 132 are communicable with a local server 150 used for processing offloaded messages, or with a data network 140 for delivering the offloaded messages. Usually, the local server 150 and the data network 140 are deemed external to the mobile communication system 100.

In implementation of an embodiment selected from the above-disclosed methods of the first and second aspects, those skilled in the art will appreciate that it is straightforward to implement the method of the selected embodiment onto the one or more processors 131, the one or more transceivers 132 and the one or more data-storing devices 133 by programming the one or more processors 131 according to the method.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for acquiring a permanent identifier of a user equipment (UE) by a gateway (GW) in a mobile communication system, the system having a radio access network (RAN), a core network (CN) and the GW, the UE communicating control messages and data traffic with the CN through the RAN, message and data transmission between the RAN and the CN being made through the GW, the CN including a mobility management entity (MME) for managing mobility of the UE, the MME being configured to create a temporary identifier for replacing the permanent identifier in message and data transmission, the method performed by the GW comprising:

among the control messages arrived at the GW, identifying a first control message that requests the MME to attach the UE to the CN, wherein the first control message contains the temporary identifier for identifying the UE by the MME;

forming a second control message from the first control message by at least altering the temporary identifier contained in the first control message to a fabricated temporary identifier that prevents the MME from successfully identifying a known UE upon receipt of the second control message;

sending the second control message to the MME without relaying the first control message thereto, causing the MME to issue to the UE a third control message that requests the UE to provide the permanent identifier to the MME for identification;

detecting arrival of a fourth control message at the GW, wherein the fourth control message is prepared by the UE in response to receipt of the third control message and contains the permanent identifier; and extracting the permanent identifier from the fourth control message received at the GW such that the GW acquires the permanent identifier without requesting the MME to provide the permanent identifier.

2. The method of claim 1, further comprising:
triggering the UE to send the first control message to the MME when the UE already attaches to the CN, comprising:
among the control messages arrived at the GW, identifying a fifth control message that is sent from the UE and that includes a request for performing a mobility procedure;
blocking the fifth control message from further propagation outside the GW; and
sending to the UE a sixth control message in response to the fifth control message, wherein the sixth control message contains a rejection to the request and an indication of detaching the UE from the CN, causing the UE to issue the first control message to the MME for requesting re-attaching to the CN.

3. The method of claim 1, wherein the GW is an offloading GW for offloading a selected portion of data traffic to a local server or a data network other than the CN.

4. The method of claim 1, wherein the permanent identifier is an International Mobile Subscriber Identity (IMSI).

5. The method of claim 1, wherein the temporary identifier is a collection of Globally Unique Temporary Identity (GUTI) and System Architecture Evolution (SAE)-Temporary Mobile Subscriber Identity (S-TMSI).

6. The method of claim 1, wherein the first control message received at the GW is an Initial UE Message.

7. The method of claim 1, further comprising:
collecting, from the control messages arrived at the GW, temporary identifiers already assigned by the MME; and
selecting the fabricated temporary identifier that forms the second control message to be a valid temporary identifier different from any of the already-assigned temporary identifiers.

8. The method of claim 1, wherein the fabricated temporary identifier that forms the second control message is selected by the GW from a set of candidate temporary identifiers, the set of candidate temporary identifiers including one or more invalid temporary identifiers not recognizable by the MME.

9. The method of claim 2, wherein:
the fifth control message is a TRACKING AREA UPDATE REQUEST transmitted as a first S1 Application Protocol (S1AP) message; and
the sixth control message is a second S1AP message containing a TRACKING AREA UPDATE REJECT that incorporates an Evolved Packet System (EPS) Mobility Management (EMM) cause #10 "implicitly detached".

10. A gateway (GW) arranged to be between a radio access network (RAN) and a core network (CN), the RAN being arranged such that a user equipment (UE) communicating control messages and data traffic with the CN through the RAN, the CN including a mobility management entity (MME) for managing mobility of the UE, the MME being configured to create a temporary identifier for replacing a permanent identifier of the UE in message and data transmission, the GW comprising:
one or more transceivers for communicating with the RAN and the CN; and
one or more processors for processing the control messages arrived at the GW;
wherein the one or more processors are configured to execute a process for acquiring the permanent identifier, the acquiring process comprising:
among the control messages arrived at the GW, identifying a first control message that requests the MME to attach the UE to the CN, wherein the first control message contains the temporary identifier for identifying the UE by the MME;
forming a second control message from the first control message by at least altering the temporary identifier contained in the first control message to a fabricated temporary identifier that prevents the MME from successfully identifying a known UE upon receipt of the second control message;
configuring the one or more transceivers to send the second control message to the MME without relaying the first control message thereto, causing the MME to issue to the UE a third control message that requests the UE to provide the permanent identifier to the MME for UE identification;
detecting arrival of a fourth control message at the GW, wherein the fourth control message is prepared by the UE in response to receipt of the third control message and contains the permanent identifier; and
extracting the permanent identifier from the fourth control message received at the GW such that the GW acquires the permanent identifier without requesting the MME to provide the permanent identifier.

11. The GW of claim 10, wherein the acquiring process further comprises:
triggering the UE to send the first control message to the MME when the UE already attaches to the CN, comprising:
among the control messages arrived at the GW, identifying a fifth control message that is sent from the UE and that includes a request for performing a mobility procedure;
configuring the one or more transceivers to block the fifth control message from further propagation outside the GW; and
configuring the one or more transceivers to send to the UE a sixth control massage, wherein the sixth control message contains a rejection to the request and an indication of detaching the UE from the CN, causing the UE to issue the first control message to the MME for requesting re-attaching to the CN.

12. The GW of claim 10, wherein:
the one or more transceivers are further used for communicating with a unit selected from a local server and a data network, the data network being other than the CN; and
the one or more processors are further configured to execute a process for offloading a selected portion of data traffic to the selected unit, the offloading process including configuring the one or more transceivers to relay the selected portion of data traffic between the RAN and the selected unit.

13. The GW of claim 10, wherein the permanent identifier is an International Mobile Subscriber Identity (IMSI).

14. The GW of claim 10, wherein the temporary identifier is a collection of Globally Unique Temporary Identity (GUTI) and System Architecture Evolution (SAE)-Temporary Mobile Subscriber Identity (S-TMSI).

15. The GW of claim 10, wherein the first control message received at the GW is an Initial UE Message.

16. The GW of claim 10, wherein the acquiring process further comprises:
collecting, from the control messages arrived at the GW, temporary identifiers already assigned by the MME; and
selecting the fabricated temporary identifier that forms the second control message to be a valid temporary identifier different from any of the already-assigned temporary identifiers.

17. The GW of claim 10, wherein the fabricated temporary identifier that forms the second control message is selected from a set of candidate temporary identifiers, the set of candidate temporary identifiers including one or more invalid temporary identifiers not recognizable by the MME.

18. The GW of claim 11, wherein:
the fifth control message is a TRACKING AREA UPDATE REQUEST transmitted as a first S1 Application Protocol (S1AP) message; and
the sixth control message is a second S1AP message containing a TRACKING AREA UPDATE REJECT that incorporates an Evolved Packet System (EPS) Mobility Management (EMM) cause #10 "implicitly detached".

19. A method for collecting International Mobile Subscriber Identities (IMSIs) of user equipments (UEs) by a gateway (GW) in a 3GPP-compliant system, an individual UE being identifiable by a mobility management entity (MME) UE S1 Application Protocol (S1AP) identifier (ID) or an eNodeB (eNB) UE S1AP ID of the individual UE, the GW having a local database for storing plural mappings, each mapping comprising a first entry of MME UE S1AP ID, a second entry of eNB UE S1AP ID and a third entry of IMSI, the method comprising:
detecting, at the GW, arrival of a first S1AP message that is addressed to a MME of the 3GPP-compliant system, wherein the first S1AP message comprises:
a Non-Access Stratum (NAS) payload of a first UE; and
the eNB UE S1AP ID of the first UE, or both of the eNB UE S1AP ID and the MME UE S1AP ID of the first UE, as identification information of the first S1AP message;
checking whether the first UE has a corresponding mapping in the database;
responsive to finding that the first UE has the corresponding mapping, updating the corresponding mapping according to identification information of the first S1AP message, and otherwise checking whether the NAS payload is ciphered;
responsive to finding that the NAS payload is ciphered, sending to the first UE a second S1AP message of rejecting a request contained in the first S1AP message;
responsive to finding that the NAS payload is not ciphered, checking whether the NAS payload contains an IMSI of the first UE;
responsive to finding that the NAS payload contains the IMSI, updating the database with a new mapping according to the MME UE S1AP ID, the eNB UE S1AP ID and the IMSI contained in the first S1AP message;
responsive to finding that the NAS payload does not contain the IMSI, altering a temporary identifier created by the MME for identifying the first UE and contained in the first S1AP message to a fabricated temporary identifier that prevents the MME from successfully identifying a known UE based on the fabricated temporary identifier; and
after the temporary identifier contained in the first S1AP message is altered, relaying to the MME the first S1AP message altered with the fabricated temporary identifier.

20. The method of claim 19, wherein the temporary identifier is a collection of Globally Unique Temporary Identity (GUTI) and System Architecture Evolution (SAE)-Temporary Mobile Subscriber Identity (S-TMSI).

* * * * *